(12) United States Patent
Lecoffre

(10) Patent No.: US 9,579,614 B2
(45) Date of Patent: Feb. 28, 2017

(54) DEVICE COMPRISING A CAVITATION CHAMBER WITH OPPOSED RADIAL AND PARALLEL FACES, IN COMMUNICATION WITH A SECONDARY CHAMBER, FOR TREATING COMPOUNDS IN A LIQUID

(75) Inventor: Yves Lecoffre, Grenoble (FR)

(73) Assignees: RC LUX, Meylan (FR); Yves Lecoffre, Grenoble (FR)

( * ) Notice: Subject to any disclaimer, the term of this patent is extended or adjusted under 35 U.S.C. 154(b) by 1022 days.

(21) Appl. No.: 13/133,308

(22) PCT Filed: Dec. 8, 2009

(86) PCT No.: PCT/FR2009/052434
§ 371 (c)(1),
(2), (4) Date: Aug. 5, 2011

(87) PCT Pub. No.: WO2010/066999
PCT Pub. Date: Jun. 17, 2010

(65) Prior Publication Data
US 2011/0284478 A1 Nov. 24, 2011

(30) Foreign Application Priority Data
Dec. 9, 2008 (FR) ...................................... 08 58405

(51) Int. Cl.
*B01D 35/00* (2006.01)
*B01F 5/06* (2006.01)
(Continued)

(52) U.S. Cl.
CPC .......... *B01F 5/0664* (2013.01); *B01F 5/0663* (2013.01); *C02F 1/34* (2013.01);
(Continued)

(58) Field of Classification Search
USPC ............ 210/175, 198.1, 206, 220, 748, 749, 210/764–766, 774; 239/251, 399, 487;
(Continued)

(56) References Cited

U.S. PATENT DOCUMENTS 4,193,635 A * 3/1980 Thiruvengadam et al. .... 299/17
4,585,357 A 4/1986 Ogata
(Continued)

FOREIGN PATENT DOCUMENTS

DE 3728946 A1 3/1989
EP 1 738 775 A1 1/2007
(Continued)

OTHER PUBLICATIONS

Arrojo et al. (A parametrical study of disinfection with hydrodynamic cavitation, Ultrasonics Sonochemistry, 15 (Nov. 9, 2007), pp. 903-908.*
(Continued)

*Primary Examiner* — Dirk Bass
*Assistant Examiner* — Hayden Brewster
(74) *Attorney, Agent, or Firm* — Young & Thompson

(57) ABSTRACT

In a method and to a device for treating a compound, such as a chemical and/or organic and/or microorganism compound, which is carried by a liquid, the liquid is driven axially through an axial inlet (21) into a central inlet portion of a radial cavitation chamber (18) having a peripheral outlet (30), such that the liquid is diverted into the central inlet portion and flows into the radial chamber in various radial directions towards the peripheral outlet; and the liquid flow conditions between the inlet and the peripheral outlet of the radial chamber are capable of generating cavitation bubbles or pockets (31) and subsequently causing the collapse or implosion of the bubbles or pockets in order to treat the compound at least partially.

11 Claims, 9 Drawing Sheets

(51) Int. Cl.
*C02F 1/34* (2006.01)
*C02F 1/00* (2006.01)
*C09K 3/00* (2006.01)
*C02F 1/32* (2006.01)
*C02F 101/30* (2006.01)
*C02F 101/32* (2006.01)
*C02F 101/36* (2006.01)

(52) U.S. Cl.
CPC .......... *C02F 1/32* (2013.01); *C02F 2101/306* (2013.01); *C02F 2101/322* (2013.01); *C02F 2101/36* (2013.01); *C02F 2101/363* (2013.01); *C02F 2201/3223* (2013.01)

(58) Field of Classification Search
USPC .................................................. 366/127, 131
See application file for complete search history.

(56) References Cited

U.S. PATENT DOCUMENTS

| | | | |
|---|---|---|---|
| 4,610,321 A * | 9/1986 | Whaling | 175/424 |
| 5,749,650 A * | 5/1998 | Kinney et al. | 366/176.2 |
| 5,899,564 A | 5/1999 | Kinney et al. | |
| 6,200,486 B1 | 3/2001 | Chahine et al. | |
| 2003/0199595 A1* | 10/2003 | Kozyuk | 516/20 |
| 2004/0032792 A1* | 2/2004 | Enomura | B01F 7/00758 366/263 |
| 2005/0270896 A1* | 12/2005 | Oogawara et al. | 366/127 |
| 2006/0256645 A1 | 11/2006 | Jensen et al. | |
| 2007/0280861 A1 | 12/2007 | Kurihara et al. | |
| 2010/0215958 A1* | 8/2010 | Enomura | 428/402 |

FOREIGN PATENT DOCUMENTS

| | | |
|---|---|---|
| JP | 11 42432 A | 2/1999 |
| JP | 2008/207099 A | 9/2008 |
| WO | 2005/028375 A1 | 3/2005 |

OTHER PUBLICATIONS

International Search Report, dated Apr. 19, 2010, from corresponding PCT application.

French Search Report, dated Jul. 16, 2009, from corresponding PCT application.

* cited by examiner

DEVICE COMPRISING A CAVITATION CHAMBER WITH OPPOSED RADIAL AND PARALLEL FACES, IN COMMUNICATION WITH A SECONDARY CHAMBER, FOR TREATING COMPOUNDS IN A LIQUID

BACKGROUND OF THE INVENTION

Field of the Invention

The present invention relates to the field of treating compounds such as chemical or organic compounds or species, or micro-organisms.

Description of the Related Art

Unwanted chemical compounds are frequently found in water which has been polluted by, for example, volatile compounds such as hydrocarbons or chlorinated compounds (for example, trichloroethylene) or by not very volatile compounds such as PCBs (polychlorobiphenyl), PCPs (pentachlorophenol) used as fungicides or certain molecules which are considered as endocrine disrupters. These bodies are usually carcinogenic and can cause illness in animals and humans.

These unwanted bodies are currently destroyed or transferred using a number of techniques including activated carbon adsorption, thermolysis, electrolytic reduction, ultraviolet irradiation or oxidation by chemical compounds such as ozone, peroxide or Fenton's reagent. Some treatments combine several of these basic methods. In all cases, the methods are expensive and awkward to implement.

The water can also contain living micro-organisms such as bacteria or microscopic algae. It is often desirable to destroy them to avoid pathological effects. Techniques equivalent to those used for chemical compounds are used for this destruction, for example sterilization using chloride or peroxide or ultraviolet irradiation.

To carry out some treatments, it has also been proposed to use ultrasonic waves emitted into liquids which are to be treated and/or to use cavitation inside the liquids which are to be treated and flowing in Venturi tubes or in equivalent axial-flow tubes. Such arrangements are described in the documents EP 1 738 775, US 2007/0280861, WO2005/028375.

The documents U.S. Pat. Nos. 5,749,650, 5,899,564 and US 2006/256645 describe treatment devices in which the liquid passes radially through annular micro-slits formed between axially superposed and axially adjustable rings. The liquid escapes through the slits, forming radial jets which are dispersed in large peripheral evacuation spaces, these jets causing turbulence in these spaces without any cavitation pocket being formed.

The document U.S. Pat. No. 6,200,486 describes a device which comprises an inner cylindrical wall having orifices and an outer cylindrical wall, which form a large space between them. As in the documents referred to in the paragraph above, the flow at the outlet of the orifices is in the form of jets in this large space.

The document U.S. Pat. No. 4,585,357 describes a device which comprises a radial micro-slit opposite which a deflecting wall is installed at a great distance. Here too, the flow through the slit causes dispersion jets.

The document JP 11 42432 describes a device in which two opposite flows collide. The resultant flow flows away radially and is discharged into a peripheral evacuation chamber, here too in the form of dispersion jets.

The document DE 3728946 describes a device in which an axial flow is deflected toward a radial chamber which has a peripheral opening. This chamber is in the shape of a truncated cone and formed such that its thickness reduces in the direction of the outside. Turbulence phenomena occur only beyond the peripheral opening of the radial chamber, in the large evacuation chamber.

The document JP 2008/207099 describes a device in which the liquid is introduced axially into a blind hole and is evacuated through divergent radial channels in the shape of truncated cones which are formed in the wall of the blind hole, at a distance from the base. In fact a Venturi-type mode of operation occurs in each divergent radial channel in the shape of a truncated cone, axially thereto.

SUMMARY OF THE INVENTION

The object of the present invention is to produce a particular cavitation effect which can improve the mechanical and/or chemical and/or bacteriological effects and/or the effects on the micro-organisms, on the compound or compounds carried in a liquid to be treated.

In order to achieve this object, the present invention is based on a cavitation effect which causes the formation of bubbles or pockets of vapor in a liquid under the action of reduced pressure and in which the bubbles or pockets of vapor produced during this application of reduced pressure then suddenly condense when the pressure rises again. Under certain conditions, this rapid condensation, also called collapse, takes place for periods of time between, for example, one ten thousandth of a second and a microsecond depending on the initial size of the bubble or the pocket, wherein this reaction can be sufficiently rapid that the gases are compressed and heated to temperatures greater than, for example, 2000° C., thus producing a plasma.

The present invention thus seeks in particular to increase the combined effects of the intense turbulence which prevails in the collapse zone of the cavitation bubbles or pockets and the very high speeds of the wall of the latter; and/or to increase the effects resulting from the plasma produced in the cavitation bubbles or pockets and capable in particular of producing radiation in the liquid; and/or to destroy compounds present in the cavitation bubbles or pockets; and/or to cause the production of molecules, ions or species or chemical radicals which can migrate into the liquid and act on the compounds carried in the liquid; and/or to produce the intense sound waves in the liquid.

The subject of the present invention is first a method for treating a compound, such as a chemical and/or organic compound and/or a micro-organism, carried by a liquid.

This method is such that two substantially radial faces arranged opposite each other delimit between them a radial cavitation chamber, one of said faces having an axial inlet orifice formed axially in its central part and said faces forming a peripheral outlet opening; that the liquid supplied axially through the axial inlet orifice is deflected and flows into said radial cavitation chamber in various radial directions toward the peripheral outlet opening; and that the thickness of said cavitation chamber (18), between said radial faces, is selected such that it is between 0.1 and 0.25 times the diameter of said axial inlet orifice and is preferably 0.14.

The flow conditions of the liquid thus generate cavitation bubbles or pockets in the first part of the radial flow, around a central inlet orifice. Also, the cavitation bubbles or pockets thus implode before they reach the peripheral outlet opening, in order to treat said compound at least partially in said cavitation chamber.

The distance between the axis of said central inlet orifice and said peripheral opening of said cavitation chamber can be selected so that it is more than twice the diameter of said central inlet orifice.

The ratio between the absolute pressure upstream of said cavitation chamber and the pressure downstream of this chamber can be between 1.5 and 6.

The subject of the present invention is also a device for treating at least one compound, such as a chemical and/or organic and/or a micro-organic, carried by a liquid.

This device comprises a first element having a substantially radial face and a substantially axial liquid-inlet orifice, and a second element having a substantially radial face.

Said radial faces are arranged opposite each other so that they form between them a space forming a radial cavitation chamber having a peripheral outlet opening, said axial inlet orifice of the first element opening out into a central part of this cavitation chamber opposite said radial face of the second element.

The thickness of said cavitation chamber, between said radial faces, is between 0.1 and 0.25 times the diameter of said axial inlet orifice and is preferably 0.14.

The liquid which is supplied axially through the axial inlet orifice is thus deflected in the central inlet part and flows into said radial cavitation chamber in various radial directions toward the peripheral outlet opening and the flow conditions of the liquid generate cavitation bubbles or pockets in the first part of this flow, around the central inlet orifice, and that the cavitation bubbles or pockets implode before they reach the peripheral outlet opening, in order to treat said compound at least partially.

Said radial faces delimiting said radial cavitation chamber can be parallel.

The distance between the axis of the central inlet orifice and said peripheral opening of said cavitation chamber can be more than twice the diameter of said central inlet orifice.

Said peripheral outlet orifice of said radial cavitation chamber can communicate with a secondary chamber connected to at least one outlet passage.

A different treatment means can be associated with said secondary chamber, in particular an emitting means, i.e., an emitter, generating ultraviolet radiation in said secondary chamber.

The first element and the second element can comprise two walls which form a space between them, one of the walls having a plurality of inlet orifices for the liquid and the other wall having a plurality of outlet orifices, so as to form a plurality of cavitation chambers in said space and between said inlet orifices and said outlet orifices.

Said inlet orifices can open out into an inlet collecting chamber and the outlet orifices can open out into an outlet collecting chamber, where said walls can be annular and concentric and are preferably cylindrical or concentric, or flat.

Said first element can have a bevel on the edge of said axial inlet orifice, where this bevel can be rounded and have a radius between 0.1 and 0.5 times the distance between said radial faces in the central part of the cavitation chamber or be in the shape of a truncated cone arranged at an angle between 30° and 60°, preferably at 45°, and over a height, in the direction of the axis of said axial inlet orifice, between 0.1 and 0.5 times the distance between said radial faces in the central part of the cavitation chamber.

BRIEF DESCRIPTION OF THE DRAWING FIGURES

The present invention will be better understood on studying treatment devices with a cavitation chamber which are described by way of non-limiting example and illustrated in the drawings, in which.

Figure 1:
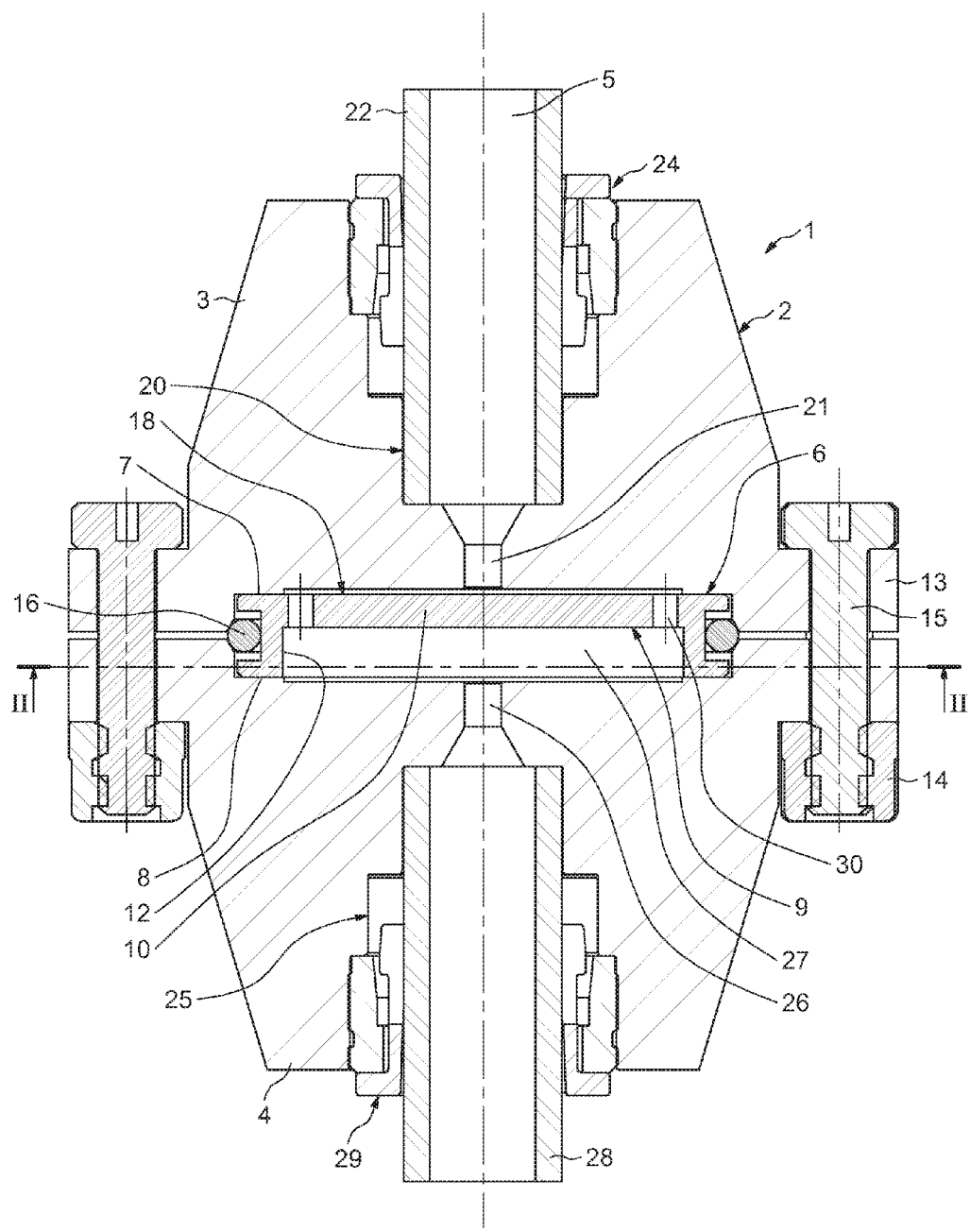
FIG. 1 shows a longitudinal section of a treatment device.
Figure 3:
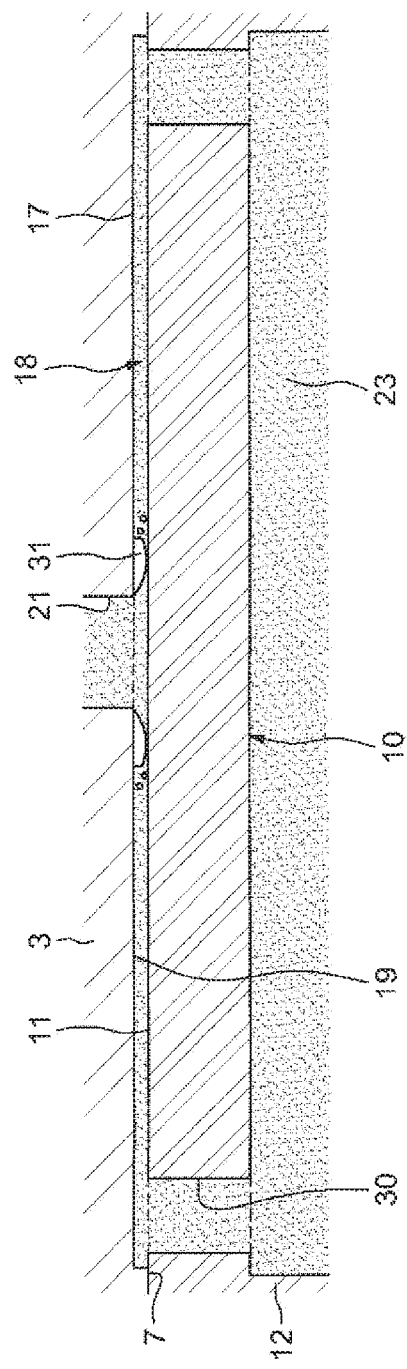
FIG. 3 shows an enlarged radial section of the cavitation chamber of the treatment device in FIG. 1.
Figure 3B:
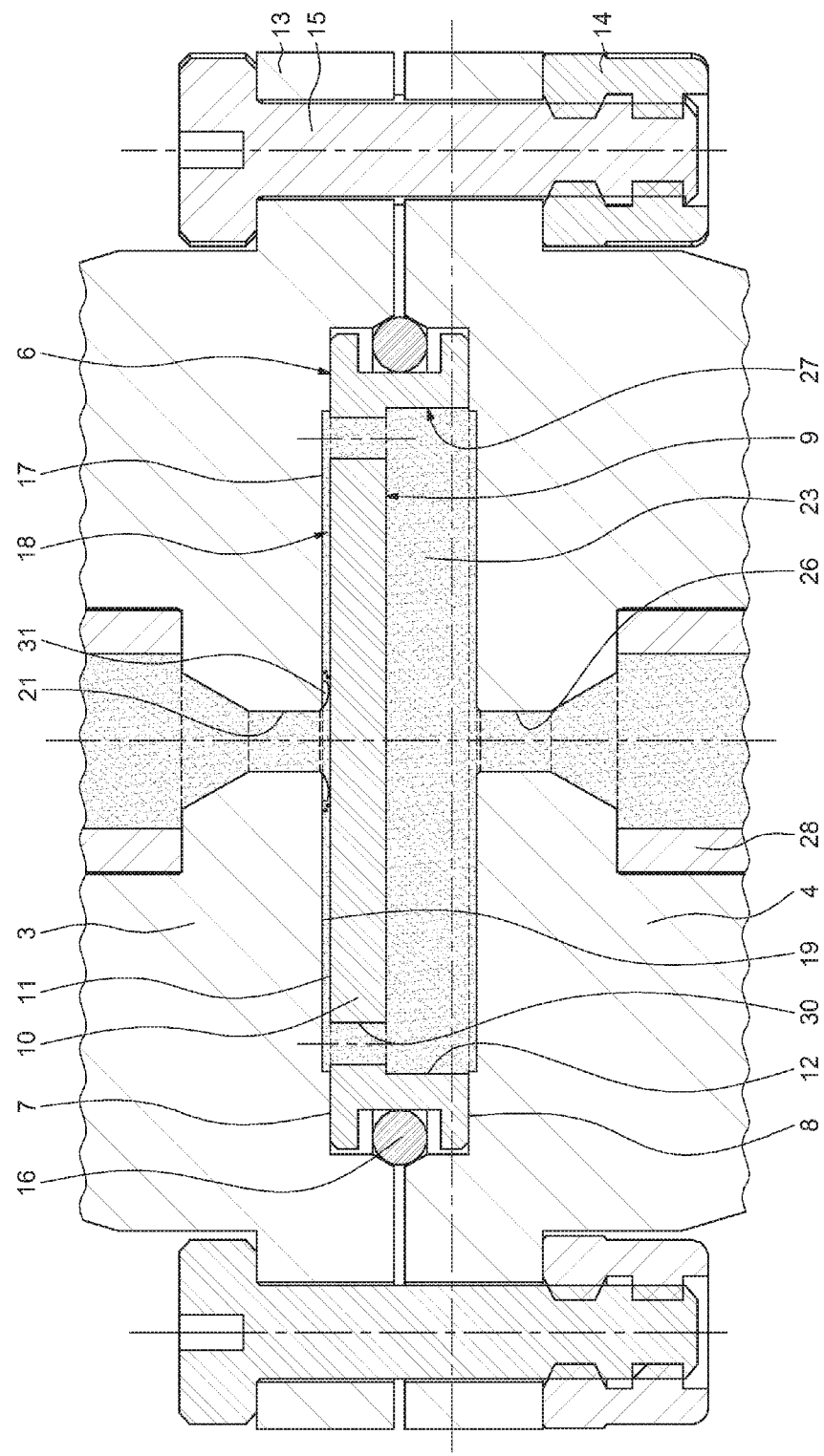
Figure 4:
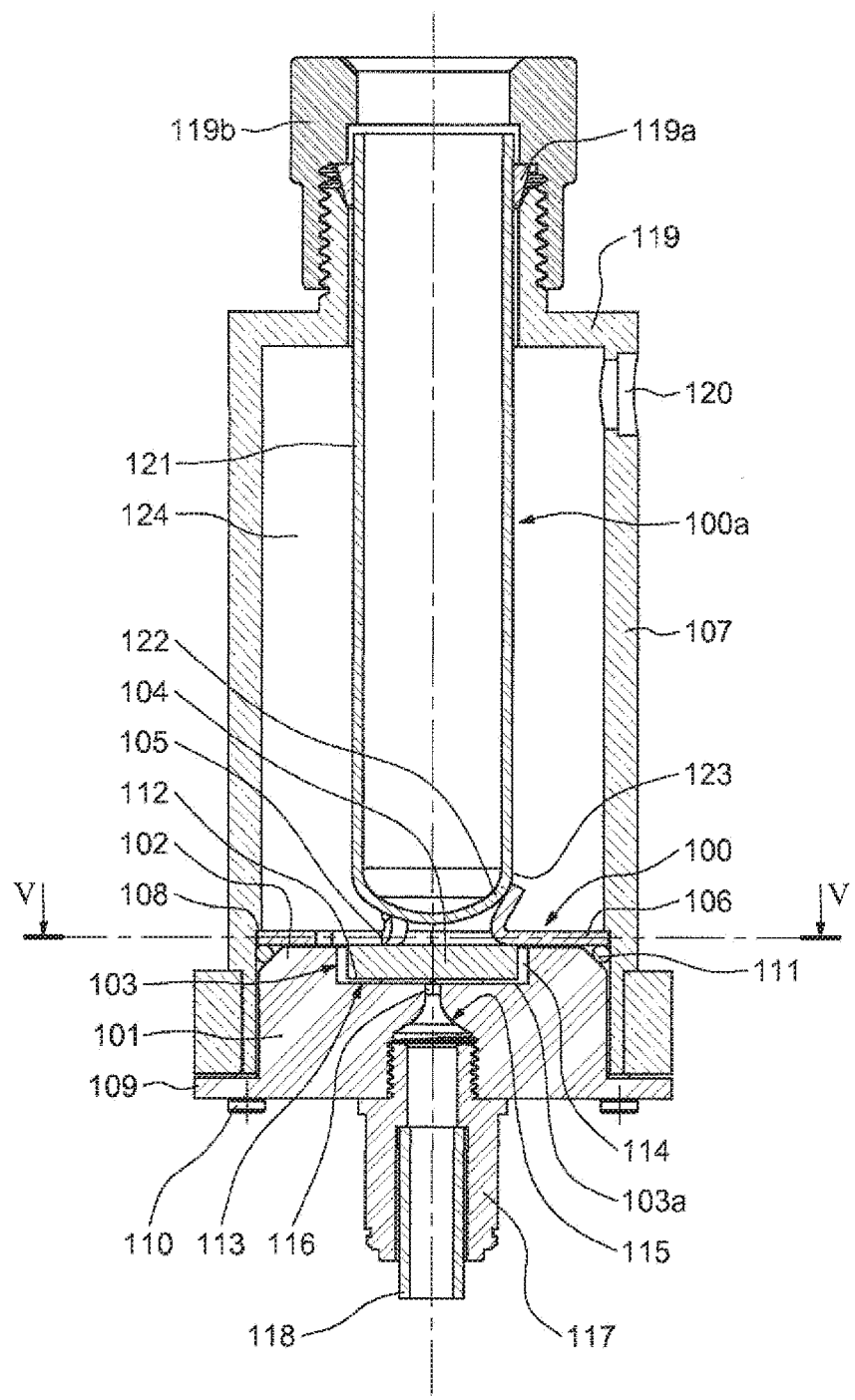
Figure 5:
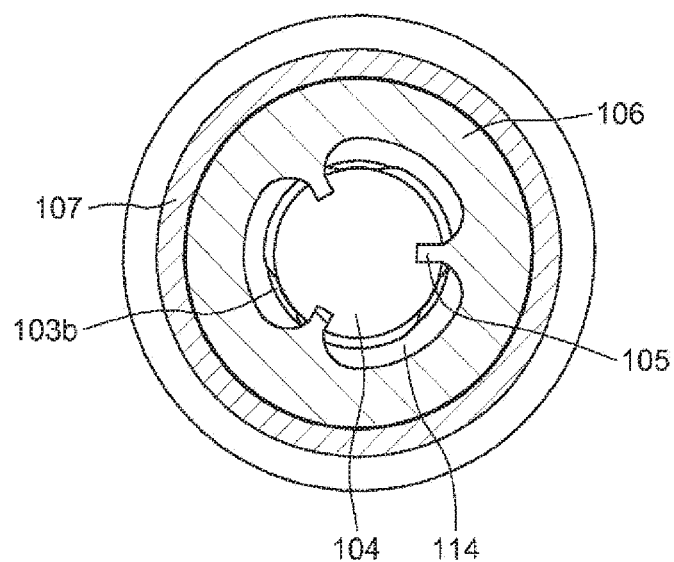
Figure 6:
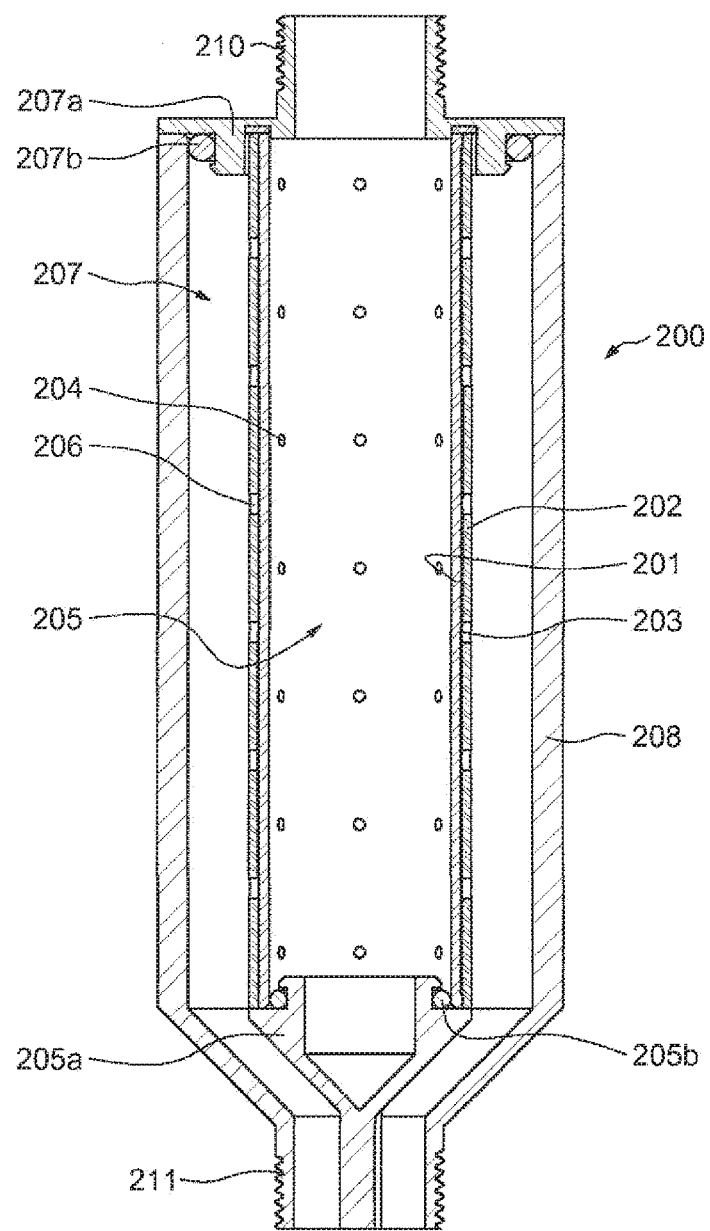
Figure 7:
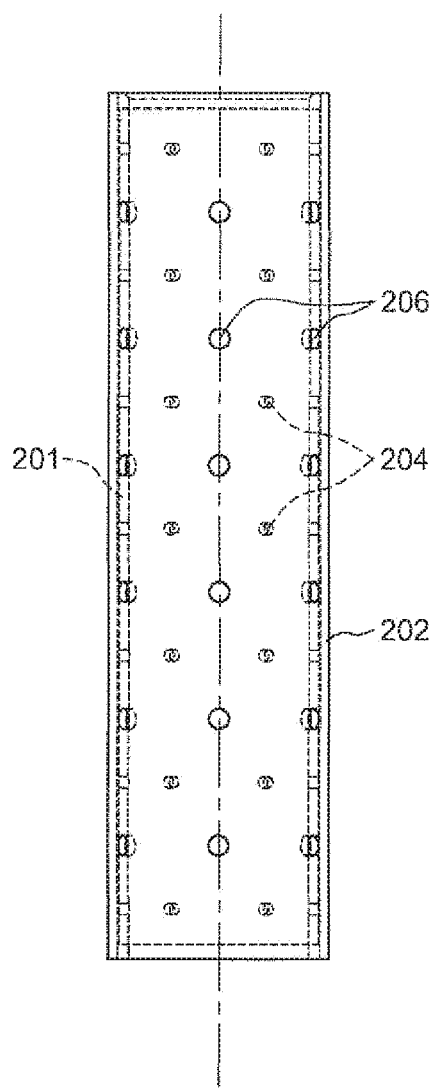
Figure 8:
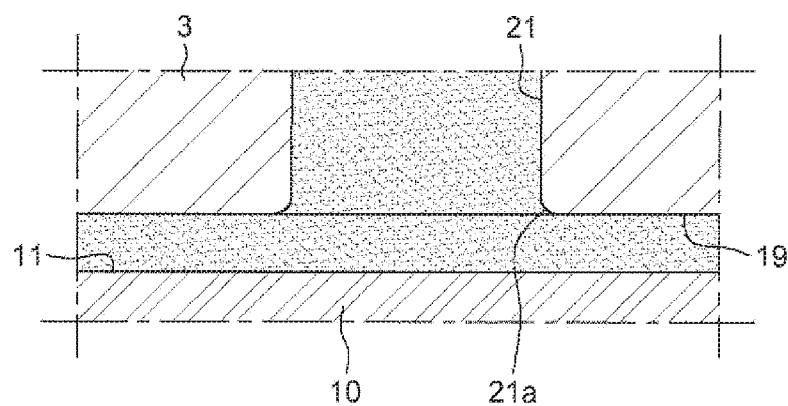
Figure 9:
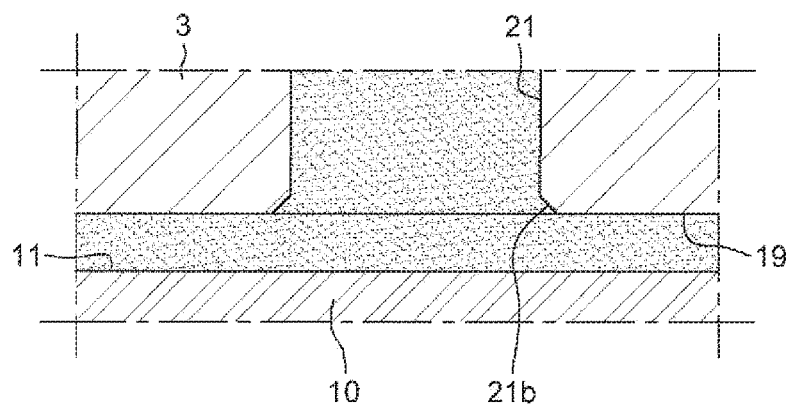

FIG. 3B corresponds to an enlarged central portion of FIG. 1 and which includes initial FIG. 3;

FIG. 4 shows a longitudinal section of an alternative embodiment of the treatment device;

FIG. 5 shows a radial section along the line V-V of the treatment device in FIG. 4;

FIG. 6 shows a longitudinal section of an alternative embodiment of the treatment device;

FIG. 7 shows an internal side view of the treatment device in FIG. 6;

FIG. 8 shows an enlarged radial section of the central part of the cavitation chamber in an alternative embodiment; and FIG. 9 shows an enlarged radial section of the central part of the cavitation chamber in an alternative embodiment.

DETAILED DESCRIPTION OF THE INVENTION

Figure 2:
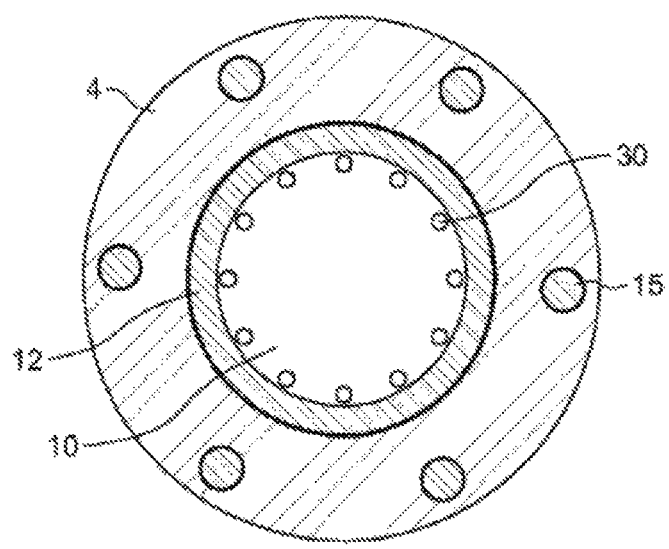
FIG. 2 shows a cross-section along the line II-II of the treatment device in FIG. 1.

A treatment device 1 shown in FIGS. 1 to 3 comprises a casing 2 which comprises two opposite shells 3 and 4 having a vertical axis 5 and delimiting between them a radial cavity 6 which is formed between an annular radial face 7 of the shell 3 and an annular radial face 8 of the shell 4. The shells 3 and 4 can be identical and placed opposite each other.

In the radial cavity 6, a spacer 9 is arranged which comprises a disk 10 which has a radial face 11 bearing against the annular radial face 7 of the shell 3 and which comprises a cylindrical peripheral part 12 which projects relative to the disk 10 and bears against the annular radial face 8 of the shell 4.

The shells 3 and 4 have adjacent peripheral parts 13 and 14 connected by bolts 15 to fix them together and maintain the bearing contact described above.

An O-ring 16 is installed between the periphery of the cylindrical peripheral part 12 of the spacer 9 and the periphery of the cavity 6, in the annular zone of the facing radial faces of the adjacent peripheral parts 13 and 14 of the shells 3 and 4.

Inside its annular radial face 7, the shell 3 (first element) has a recess 17 which delimits, with the radial face 11 of the disk 10 (second element), a cavitation chamber 18, the base 19 of the recess 17 extending radially, parallel to the radial face 11 of the disk 10.

The shell 3 has an axial passage 20 which has at the end a, for example cylindrical, central orifice 21 which opens out axially into the central part of the cavitation chamber 18, through the radial face formed by the base 19 of the recess 17. The end of the duct 22 for supplying a liquid 23 is engaged and fixed leaktightly in the passage 20, for example by an annular packing gland system 24.

The shell 4 has an axial passage 25 which opens out axially, for example through a central orifice 26 at the end, into the central part of the secondary chamber 27 formed in the spacer 9, opposite the radial cavitation chamber 18. The end of the duct 28 for evacuating the liquid 23 is engaged and fixed leaktightly in the passage 25, for example by an annular packing gland system 29.

The disk 10 of the spacer 9 has a plurality of through passages 30 which open out, on the one hand, into the periphery of the radial cavitation chamber 18 and, on the other hand, into the secondary chamber 27. The through passages 30 are regularly distributed over a circumference so as to form a peripheral outlet opening of the radial cavitation chamber 18. These through passages 30 can be formed by cylindrical holes or circumferential slits.

The liquid 23 supplied by the supply duct 22 is thus introduced into the central part of the radial cavitation chamber 18 through the central orifice 21, is then deflected radially in this central part, and then flows into the radial cavitation chamber 18 in various radial directions toward the peripheral outlet opening formed by the through passages 30. The liquid issued from the through passages 30 is then collected in the secondary chamber 27, and then evacuated through the evacuation duct 28.

The conditions of the radial flow of the liquid 23 in the radial cavitation chamber 18, from the central inlet orifice 21 to the peripheral through passages 30, are such that this flow is hydrodynamic, that cavitation bubbles or pockets 31 appear in the first part of this flow, around the central inlet orifice 21, and then collapse or implode immediately before, preferably well before, these cavitation bubbles or pockets 31 reach the peripheral outlet through passages 30.

The phenomenon of the creation and collapse of the cavitation bubbles or pockets results from the effect of reduced pressures followed immediately by elevated pressures. During the creation of the bubbles, gases dissolved in the liquid tend to be released in these bubbles. During the collapse, an adiabatic compression is produced which causes very high temperatures and very high pressures in the bubbles which implode.

The cavitation produced is a hydrodynamic cavitation which results from the acceleration of the flow due to a reduction in its passage cross-section followed by a gradual increase in said passage cross-section in a virtually radial direction. This cavitation makes it possible to create a very sudden rise in pressure in the condensation zone or collapses, which causes an increase in the intensity of the above-described effects for a given flow rate. Furthermore, the particular shape of this device causes the phenomenon to occur with a loss of pressure and hence a minimal expense of energy.

The cavitation pockets or bubbles 31 can include a main annular pocket or bubble very close to the inlet orifice 21 and sticking to or situated against the radial face 19 of the shell 3, supplied with gas dissolved by the liquid which flows through. This main annular pocket or bubble is split into smaller-sized pockets or bubbles which move away from the center of the chamber and which condense, collapse or implode.

By virtue of the treatment device 1, the cavitation bubbles or pockets 31 produced are able to at least partially treat the compound or compounds carried by the liquid. This treatment can be chemical, thermal, chemical and thermal and/or may be sonic as the cavitation phenomenon may produce sound waves which radiate in the liquid.

The formation against the wall 19 and the collapse of the bubbles or pockets of vapor 31 can be localized in a virtually predetermined fashion and/or can be controlled. Because the thickness of the radial cavitation chamber 18 is adapted relative to the cavitation bubbles or pockets 31 produced, the cavitation affects all of the liquid to be treated which flows into this chamber 18.

When the liquid such as water carries one or more chemical compounds, specific chemical radicals or species can be formed in the cavitation bubbles 31 produced and collapse, these specific chemical radicals or species being capable of reacting with these chemical compounds and producing other compounds. The chemical effects can cause the destruction of compounds present in the bubbles, generally volatile compounds initially dissolved in the liquid by the production of molecules, ions or radicals which can migrate in the liquid and have an action on the compounds which it carries. Among these actions, oxidation by OH° radicals makes it possible to destroy dissolved molecules which are difficult to remove.

When the liquid such as water carries one or more micro-organisms, the cavitation bubbles 31 produced can make it possible to attack these micro-organisms and/or films or accumulations of the latter, in order to destroy, disperse or break them up by chemical or mechanical effects or by intense pressure waves.

The flow conditions of the liquid in the cavitation chamber 18 of the treatment device 1 can result from a subsequent dimensioning.

The thickness of the cavitation chamber 18 between the opposite radial faces 7 and 19 can be between 0.1 and 0.25 times the diameter of the central supply orifice 21.

The thickness of the cavitation chamber 18 can in particular be 0.14 times the diameter of the central supply orifice 21.

The distance between the axis 5 of the central supply orifice 21 and the circumference on which is formed the peripheral opening of the cavitation chamber 18 determined by the through passages 30 can be more than 2.5 times the diameter of the central supply orifice 21.

The ratio between the inlet pressure and the outlet pressure can be between 1.5 and 6.

In one exemplary embodiment, the diameter of the supply orifice 21 can be 8 mm, the thickness of the cavitation chamber 18 can be 1.12 mm, the distance between the axis 5 of the central supply orifice 21 and the circumference on which is formed the peripheral opening of the cavitation chamber 18 determined by the through passages 30 can be 30 mm.

According to one alternative embodiment shown in FIG. 8, said first element 3 can have a rounded bevel 21a formed on the edge of the axial inlet orifice 21 and joining the face 17. This rounded bevel 21a can have a radius r which is between 0.1 and 0.5 times the distance between the radial faces 11 and 19 in the central part of the cavitation chamber 18.

In another alternative embodiment shown in FIG. 9, said first element 3 can have a bevel 21b in the shape of a truncated cone and formed on the edge of the axial inlet orifice 21. This bevel 21b in the shape of a truncated cone can be arranged at an angle of between 30° and 60°, and preferably at 45°. Its height h, in the direction of the axis of the axial inlet orifice 21, can be between 0.1 and 0.5 times the distance between the radial faces 11 and 19 in the central part of the cavitation chamber 18.

The bevels 21a or 21b can facilitate the formation of the cavitation pocket 31 at their periphery.

With reference to FIGS. 4 and 5, it can be seen that a different treatment device 100 is shown which comprises a cylinder 101 (first element) which has a radial front face 102 in which is formed a cylindrical recess 103 and which comprises a circular disk 104 (second element) engaged at a distance in the cylindrical recess 103 and fixed axially against three inner fingers 105 of a circular washer 106 bearing against the radial front face 102 of the cylinder 101.

The stack formed by the cylinder 101 and the circular washer 106 is engaged in the end of an outer cylindrical tube 107 such that the washer bears against an inner shoulder 108 of this tube 107. The cylinder 101 has a peripheral shoulder 109 and fixing screws 110 which pass through this shoulder and are screwed into the cylindrical tube 107 so as to fix this stack. An O-ring 111 ensures the leaktightness between said stack and the cylindrical tube 107.

The circular disk 104 is placed in the cylindrical recess 103 such that a radial face 112 of this disk 104 and the radial base 103a of this recess 103 form between them a cavitation chamber 113 of constant thickness and that the periphery of the disk 104 and the periphery of the recess 103 determine between them an annular through passage 114 determining a peripheral opening of the cavitation chamber 113 and opening out inside the tube 107, between the inner fingers 105 of the circular washer 106.

In order to ensure a constant thickness of the cavitation chamber 113, the radial base 103a of the recess 103 is provided with projecting bulges 103b against which bears the radial face 112 of the disk 104, these bulges 103b being placed at the periphery so as not to adversely affect the flow of the liquid. The bulges 103b also center the disk 104 in the recess 103.

The cylinder 101 has an axial passage 115 which has a, for example cylindrical, central orifice 116 at the end, which opens out axially into the central part of the cavitation chamber 113. A connector 117 in which the end of the duct 118 supplying a liquid is fixed leaktightly is screwed into the passage 115.

The structure thus formed is such that the cavitation chamber 113 is equivalent to the cavitation chamber 18 of the treatment device 1.

The treatment device 100 can advantageously be connected in series with another treatment device 100a as described below.

The other end of the cylindrical tube 107 is closed by a radial wall 119 and has a lateral outlet opening 120 in the vicinity of this wall 119. A duct (not shown) can be connected to the lateral outlet opening 120 in order to evacuate the treated liquid.

The wall 119 is traversed leaktightly, via a seal 119a held by a sleeve 119b, by an inner axial cylindrical tube 121 made, for example, from quartz, a closed end 122 of which is situated in proximity to the circular disk 104, the inner fingers 105 of the circular washer 106 being extended by tips 123 for centering and holding the end 122 of the inner cylindrical tube 121.

The inner tube 121 is connected to known means (not shown) which can generate in this tube 121 ultraviolet radiation radiating in the annular chamber 124 formed between the outer tube 107 and the inner tube 120.

A liquid such as water carrying one or more compounds to be treated is thus, in a first step, treated by the treatment device 100 and then immediately, in a second step, treated by the treatment device 100a in the annular secondary chamber 124 by the ultraviolet radiation generated by the inner tube 120, and then evacuated through the lateral outlet opening 120. The radiation radiates throughout the annular secondary chamber 124. As the disk 104 is made of quartz, the radiation can also reach the annular through passage 114 and the cavitation chamber 113.

Such an arrangement is particularly advantageous when micro-organisms carried by water need to be destroyed in order to treat the latter and make it less polluted.

In an alternative, the means for generating radiation could be placed around the outer tube 107.

In an alternative embodiment illustrated in FIGS. 6 and 7, a treatment device 200 comprises an inner cylindrical wall 201 and an outer cylindrical wall 202 which are concentric and delimit between them a cylindrical space 203 of constant thickness which is closed at its ends by any known means.

The inner cylindrical wall 201 has a plurality of inlet orifices 204 opening out, on the one hand, into the space 203 and, on the other hand, into the internal space 205 of this wall 201, this internal space 205 forming a longitudinal inlet collecting chamber.

The outer cylindrical wall 202 has a plurality of outlet orifices 206 which open out, on the one hand, into the space 203 and, on the other hand, into a peripheral space 207 delimited by a cylindrical peripheral wall 208, the peripheral wall 207 forming a longitudinal annular outlet collecting chamber.

The outlet orifices 206 are distributed around and at a distance from the inlet orifices 204 so as to form a plurality of substantially radial cavitation chambers 209 with substantially parallel flows, which function respectively like the cavitation chambers described in the preceding examples.

In the example shown, as shown in more detail in FIG. 7, the inlet orifices 204 are distributed evenly spaced apart all around the inner cylindrical wall 201 and longitudinally relative to the latter, and the outlet orifices 206 are distributed evenly spaced apart all around the outer cylindrical wall 202 and longitudinally relative to the latter, offset by half a pitch relative to the inlet orifices 204, circumferentially and longitudinally. The outlet orifices 206 advantageously have cross-sections which are considerably larger than the cross-sections of the inlet orifices 204.

In the example shown, as shown in more detail in FIG. 6, the internal space 205 forming an inlet collecting chamber is closed at one end by a radial wall 205a and can communicate at its other end with an axial inlet duct 210 which can be connected to a source of liquid to be treated. The peripheral space 207 forming an outlet collecting chamber is closed at one end by an annular wall 207a and can communicate with an axial outlet duct 211 for the liquid treated in parallel in the cavitation chambers 209, this axial outlet duct 211 being opposite the axial inlet duct 210. The inner and outer cylindrical walls 201 and 202 are carried at one end by the wall 205a and at the other end by the wall 207a in leaktight fashion via O-rings 205b and 207b.

In other alternative embodiments, the walls 201 and 202 could have different annular shapes, for example have the shape of a truncated cone, or could be flat.

In another alternative embodiment, any one of the treatment devices described above could be connected in series, the liquid outlet of one device communicating with the liquid inlet of the following device.

The invention claimed is:

1. A device for treating at least one compound in a liquid, comprising:
   a first element having a radial face and an axial liquid-inlet orifice, and
   a second element having a radial face, in which said radial faces are arranged opposite each other and parallel, so as to form a radial cavitation chamber having a peripheral outlet opening, the first and second elements have bearing faces which bear on each other such that said radial cavitation chamber has one thickness between said radial and parallel faces of the first and second elements, said axial inlet orifice of the first element opening out into a central part of the cavitation chamber opposite said radial face of the second element and the peripheral outlet opening being distributed at a periphery of the radial cavitation chamber;

said thickness of said cavitation chamber, between said radial and parallel faces, has a value comprising between 0.1 and 0.25 times a diameter of said axial inlet orifice, a distance between an axis through a center of the axial inlet orifice and said peripheral opening of said cavitation chamber being more than twice the diameter of said axial inlet orifice; and a secondary chamber communicating with the said peripheral outlet opening of the cavitation chamber, the secondary chamber having an outlet orifice, whereby the liquid is supplied axially through the axial inlet orifice and is deflected in the central inlet part and flows into said radial cavitation chamber in various radial directions toward the peripheral outlet opening and then in the secondary chamber towards the outlet orifice; and whereby, a ratio between a pressure upstream of said radial cavitation chamber and the pressure downstream of the radial cavitation chamber having a value comprising between 1.5 and 6, flow conditions of the liquid by themselves generate cavitation bubbles or pockets in the first part of this flow, around the axial inlet orifice, and the cavitation bubbles or pockets implode before they reach the peripheral outlet opening, in order to treat said compound at least partially.

2. The device as claimed in claim 1, in which said peripheral outlet opening of said radial cavitation chamber communicates with said secondary chamber connected to at least one outlet passage.

3. The device as claimed in claim 2, further comprising a different treatment associated with said secondary chamber, which is an emitter generating ultraviolet radiation in said secondary chamber.

4. The device as claimed in claim 2, in which the first element and the second element comprise two walls which form a space, one of the walls having a plurality of inlet orifices for the liquid and the other wall having a plurality of outlet orifices, so as to form a plurality of cavitation chambers in said space and between said inlet orifices and said outlet orifices.

5. The device as claimed in claim 4, in which said inlet orifices open out into an inlet collecting chamber and the outlet orifices open out into an outlet collecting chamber, where said walls are cylindrical or concentric, or flat.

6. The device as claimed in claim 1, in which said first element has a bevel on the edge of said axial inlet orifice, where this bevel is rounded and has a radius between 0.1 and 0.5 times the distance between said radial faces in the central part of the cavitation chamber or is in the shape of a truncated cone arranged at an angle between 30° and 60° and over a height, in the axis of said axial inlet orifice, between 0.1 and 0.5 times the distance between said radial faces in the central part of the cavitation chamber.

7. The device as claimed in claim 3, in which the first element and the second element comprise two walls which form a space between them, one of the walls having a plurality of inlet orifices for the liquid and the other wall having a plurality of outlet orifices, so as to form a plurality of cavitation chambers in said space and between said inlet orifices and said outlet orifices.

8. The device as claimed in claim 2, in which said first element has a bevel on the edge of said axial inlet orifice, where this bevel is rounded and has a radius between 0.1 and 0.5 times the distance between said radial faces in the central part of the cavitation chamber or is in the shape of a truncated cone arranged at an angle between 30° and 60°, and over a height, in the axis of said axial inlet orifice, between 0.1 and 0.5 times the distance between said radial faces in the central part of the cavitation chamber.

9. The device as claimed in claim 3, in which said first element has a bevel on the edge of said axial inlet orifice, where this bevel is rounded and has a radius between 0.1 and 0.5 times the distance between said radial faces in the central part of the cavitation chamber or is in the shape of a truncated cone arranged at an angle between 30° and 60°, and over a height, in the axis of said axial inlet orifice, between 0.1 and 0.5 times the distance between said radial faces in the central part of the cavitation chamber.

10. The device as claimed in claim 1, wherein the thickness of said cavitation chamber between said radial faces is 0.14 times the diameter of said axial inlet orifice.

11. The device as claimed in claim 1, in which said first element has a bevel on the edge of said axial inlet orifice, where this bevel is rounded and has a radius between 0.1 and 0.5 times the distance between said radial faces in the central part of the cavitation chamber or is in the shape of a truncated cone arranged at an angle of 45°, and over a height, in the axis of said axial inlet orifice, between 0.1 and 0.5 times the distance between said radial faces in the central part of the cavitation chamber.

* * * * *